Patented Oct. 17, 1950

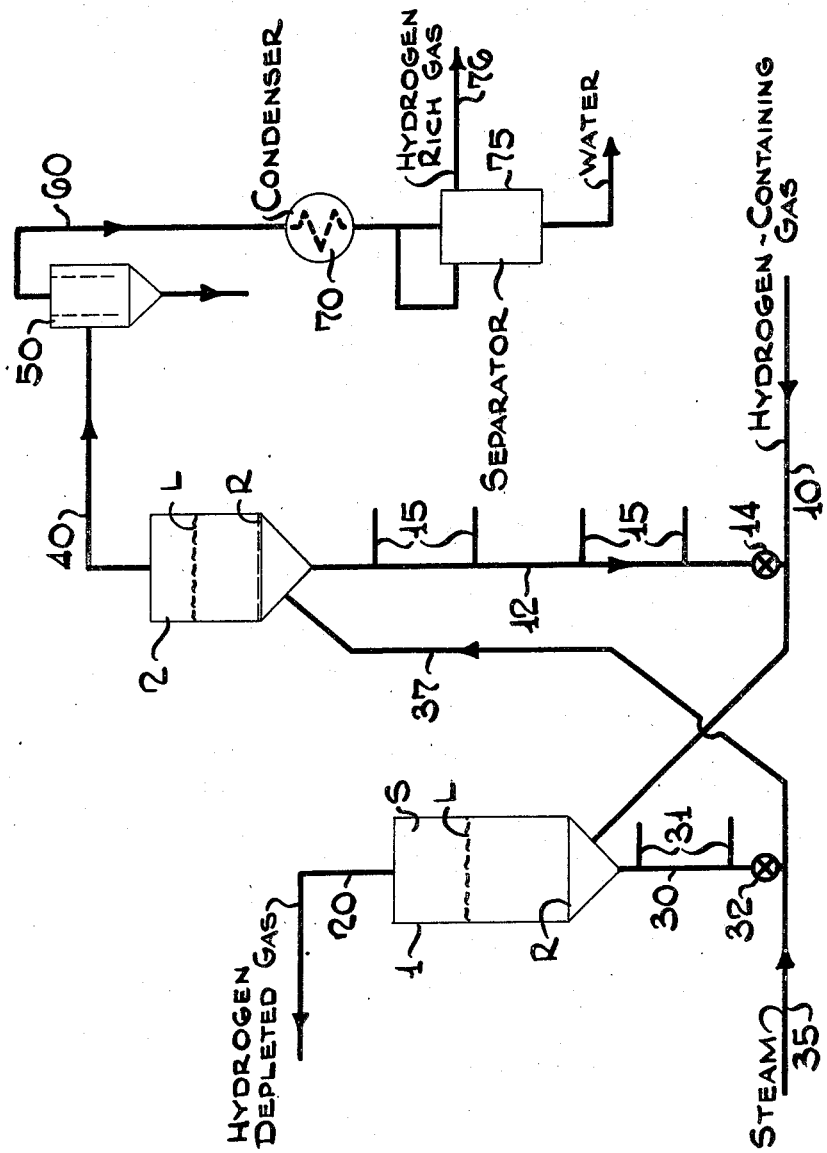

2,526,524

UNITED STATES PATENT OFFICE 2,526,524

METHOD OF SEPARATING HYDROGEN FROM HYDROGEN CONTAINING GASES

Albert B. Welty, Jr., Mountainside, N. J., assignor to Standard Oil Development Company, a corporation of Delaware Application December 14, 1944, Serial No. 568,126

2 Claims. (Cl. 23—210)

The present invention relates to purifying hydrogen or to obtaining hydrogen from a mixture of gases containing the same in a richer or more concentrated state than in the original mixture.

In the petroleum industry as well as in certain others, normally gaseous hydrocarbons are obtained as a by-product. This hydrocarbon gas often contains appreciable quantities of hydrogen which, if recovered in relatively pure form, could be used advantageously in other processes such as hydrogenation of hydrocarbons, ammonia syntheses, etc. Sources of such hydrogen-containing gas are catalytic cracking, butene dehydrogenation, "hydroforming," thermal cracking, butane dehydrogenation, and other petroleum refinery processes. The hydrogen may be present in concentrations as low as 10–20 per cent by volume or as high as 80–90 per cent. The present invention comprises a process for recovering this hydrogen in a more concentrated and usable form.

The main object of the present invention therefore is to recover the hydrogen in a concentrated form from a source in which it is mixed and/or diluted with other gases, such as normally gaseous hydrocarbons.

Another object of the present invention is to recover hydrogen gas in concentrated form from a mixture of hydrogen and other gases in a continuous operation and in a manner which is cheaper and more expeditious than the methods previously employed.

Other and further objects of the present invention will appear from the following more detailed description and claims.

In the accompanying drawing I have shown diagrammatically a form and arrangement of apparatus elements in which a preferred modification of my invention may be carried into effect.

In the drawings similar reference characters refer to similar parts. Referring in detail to the drawing, I provide two cylindrical cases 1 and 2 provided with conical bases and a reticulated member R which may be a screen or grid. As will presently appear, the gist of the present invention resides in causing a hydrogen-containing gas to contact, at elevated temperatures, a solid, adsorbent material which selectively adsorbs hydrogen, and thereafter, in a separate zone, to treat the adsorbent material with a condensable gas to displace the hydrogen, and to form a mixture of hydrogen and condensable gas, which condensable gas may be liquefied and separated from the hydrogen, thus providing hydrogen in a concentrated or enriched form. Toward this end, therefore, the hydrogen-containing gas enters the system through line 10, is mixed with a powdered solid material discharged into line 10 from a standpipe 12 controlled by valve 14 to form a suspension of the solid material in gas, which suspension is then conveyed to the bottom of treater 1 where it passes upwardly through grid R to form, above the grid to the level L, a dense suspension of solid in gas, caused or effected by controlling the linear velocity of the gas and the amount of solid material fed to the adsorption zone 1. For instance, suppose that the solid adsorbent material is molybdenum oxide (12 weight per cent) carried on activated alumina (88 weight per cent) and that this adsorbent is in the form of a powder having a particle size of from 300–400 mesh, by controlling the linear velocity of the gases in the adsorption zone 1 within the limits of ¼ to 5 ft. per second, preferably ½ to 3 ft. per second, and supplying sufficient adsorbent so that the dense suspension existing between R and L weighs from 15 to 25 lbs. per cubic foot, then the said dense suspension is obtained. It is important to note that the standpipe 12 is in communication with case 2, which latter case is at a point elevated above adsorption zone 1 so that a natural flow of solid adsorbent material from zone 2 to zone 1 may be effected by the static pressure developed by the elevated position of case 2. To aid in this free flow, and particularly to prevent bridging and plugging in standpipe 12, I provide a number of taps 15 in communication with standpipe 12, through which taps I force into the said standpipe, a slow current of gas, such as some of the gas in line 10, in order to maintain the downflowing powdered material actually fed to adsorption zone 1 is controlled by valve 14, and by controlling the flow of material, that is, the amount of powdered material fed to adsorption zone 1, and the linear velocity of the gasiform material therein, I may fix the upper level L, of the dense suspension previously referred to.

Above L there is a space S in which a suspension of catalyst in gas is very substantially less than below L. Hence, as the gas exits from adsorption zone 1 through line 20 the concentration of powdered material may be as low as 0.030 lb. per cubic foot. This gas may be passed through solid-gas separating devices such as centrifugal separators, electrical precipitators, and the like, to separate the last traces of adsorbent material. I have omitted a showing of conventional apparatus so as to direct attention to the real heart of the present invention. Also it is desirable to include a plurality of centrifugal separators (not shown) within case 1 in the space S to cause the separation of solid from gas by passage of the suspension therethrough, or to employ any known gas-solid contacting devices for effecting the above stated solid separation from gas.

Up to this point it will be observed I have described the method of feeding adsorbent material to an adsorption zone, together with a hydrogen-containing gas. My purpose is to adsorb and thereby remove from the hydrogen-containing gas, hydrogen, and to procure it in an adsorbed form on or within the powdered material so that the gas issuing through line 20 will be depleted in hydrogen content. I have found that temperatures of from 600–2000° F. but preferably from 900–1400° F. give best results. The pressure in the adsorption zone may be approximately atmospheric. The amount of adsorbent material charged to adsorption zone 1 with the gas varies with the nature of the adsorbent, but in the case of molybdenum oxide on alumina, which I have mentioned, I find that good results are obtained by charging 3–30 lbs. of catalyst per cubic foot of hydrogen-containing gas, measured at standard conditions.

The adsorbent material containing the adsorbed hydrogen is continuously withdrawn from adsorption zone 1 through a second standpipe 30 also provided with suitable taps 31 into which gas may be bled to prevent plugging and bridging within the standpipe, and also carrying a flow control valve 32. The lower end of standpipe 30 is in communication with a steam line 35 and the adsorbent material is discharged into said line 35 after which it is carried in the steam into the bottom of the stripping zone 2. The flow of steam and quantity of adsorbent material in stripping zone 2 is maintained under the same conditions as existing in adsorption zone 1, that is to say, the velocity of the gas and/or vapor is maintained within the limits of from ¼ to 5 ft. per second, and catalyst is fed to zone 2 at such a rate as to keep the level L in zone 2 at the desired height. The density of this fluidized mass in zone 2 is from 5–50 lbs. per cubic foot. The steam in line 35 is superheated to say 1000° to 1400° F. for best results.

The steam serves to purge out or displace the hydrogen adsorbed by the adsorbent material, and a mixture of steam and hydrogen passes from the stripping zone 5 through line 40. As in the case of line 20, the concentration of adsorbent material in gas is very low, but nevertheless it contains sufficient solid entrained material to make it necessary to pass the mixture through gas-solid contacting devices which will remove the last traces of solid material, such as centrifugal separators 50. Two or more of these separators may be employed, and also one or more electrical precipitators, if necessary, to separate the adsorbent material from the steam and hydrogen.

The said hydrogen and steam in line 60 passes through a condenser 70 where it is cooled sufficiently to condense the steam, and then the mixture of condensate and hydrogen is discharged into a separator 75 from which the hydrogen-containing gas may be recovered through line 76.

Instead of employing molybdenum oxide on alumina, which I have found is capable of adsorbing at least 7–8 volumes of hydrogen per volume of catalyst, I may use other adsorbent materials. The molybdenum oxide may be used supported on suitable material, such as an acid-treated Bentonitic clay, activated alumina, pumice, Attapulgus clay, silica gel, silica-alumina gel and the like. A particular suitable adsorbent is molybdena on alumina, as previously mentioned.

To recapitulate, the present invention is concerned with obtaining from a hydrogen-containing gas a quantity of hydrogen-containing gas richer in hydrogen than the first mentioned gas. I accomplish this result by contacting the original hydrogen-containing gas with a solid adsorbent powdered material in the form of a turbulent, fluidized mass of powdered adsorbent material carried in dense suspension in a gas in an adsorption zone, removing the adsorbent material containing adsorbed hydrogen and conducting it to a steam stripping zone where it is contacted with steam in the form of a turbulent fluidized mass of powdered material carried in dense suspension in said steam whereby the steam serves to strip hydrogen from the adsorbent to provide a gaseous mixture containing steam and hydrogen, which mixture may be cooled to condense the water and to provide a hydrogen-enriched gas.

Without wishing to be bound by any theory of operation, I believe that my process operates as follows: The solid adsorbent material in adsorption zone 1, that is the supported molybdenum oxide, preferentially adsorbs the hydrogen from the hydrogen-rich stream. At the same time the adsorbent will be reduced somewhat. In the stripping zone the steam will be preferentially adsorbed thus desorbing the hydrogen from the surface. At least partial reoxidation also may occur, thus contributing to the hydrogen release. In the case of $MoO_3$ on alumina about 80% of the hydrogen obtained was adsorbed on the surface of the solid at 1000° F. and 1 atmosphere pressure.

My process is distinguishable over the art on the steam-iron process for making hydrogen, for example, in two particulars as follows: (1) The temperatures employed in zone 1 of my process are lower; and (2) in the steam-iron process no appreciable amount of hydrogen is adsorbed. It is possible to obtain commercially pure hydrogen by my process from gases containing a minor proportion of hydrogen.

There will come a time when the solid adsorbent material may become fouled with carbonaceous material due to the fact that it is in contact with hydrocarbons and, in particular, olefins at relatively high temperatures, and in that case it will be necessary to remove a stream of the material in line 12 to a third fluidizing zone (not shown) where it is contacted with air for the purpose of burning off contaminants and purifying the adsorbent material. This third fluidizing zone may be of the same shape and size as zones 1 and 2 and may be operated in like manner using, of course, an oxygen-containing gas instead of a hydrogen-containing gas. I deem it unnecessary to illustrate this feature of my invention for others have disclosed methods for regenerating by burning powdered adsorbent material while it is in the form of a dense suspension in a regeneration gas.

Numerous modifications of my invention will suggest themsevles to those who are familiar with this art without departing from the spirit thereof.

What I claim is:

1. A continuous method for recovering hydrogen from a gaseous mixture consisting of hydrogen and normally gaseous hydrocarbons which comprises: charging the said gaseous mixture to an adsorption zone containing a turbulent fluidized mass of solid particles consisting of molybdenum oxide supported on activated alumina, permitting the hydrogen containing gas to contact the solid particles in the adsorption zone at a temperature within the range of about 900 to 1400° F. and at a pressure of about one atmosphere, whereby at least a portion of the hydrogen in the gaseous mixture is adsorbed by the said solid particles, withdrawing continuously from the adsorption zone solid particles including adsorbed hydrogen, forming a suspension of said withdrawn solid particles with steam, and conducting the suspension to a stripping zone where it is formed into a turbulent fluidized mass of solid particles carried in dense suspension in steam, whereby the steam serves to displace adsorbed hydrogen from the solid particles, withdrawing a gaseous stream from the stripping zone consisting of steam and hydrogen, cooling the said gaseous stream to condense the steam, and thereafter recovering hydrogen from the condensed steam.

2. The method of claim 1 in which the said adsorptive carrier consists of about 12 weight percent of molybdenum oxide and 88 weight percent activated alumina and in which the said solid particles have a particle size smaller than about 100 mesh.

ALBERT B. WELTY, JR.

REFERENCES CITED

The following references are of record in the file of this patent:

UNITED STATES PATENTS

| Number | Name | Date |
|---|---|---|
| 2,198,560 | Marshall | Apr. 23, 1940 |
| 2,361,978 | Swearingen | Nov. 7, 1944 |

FOREIGN PATENTS

| Number | Country | Date |
|---|---|---|
| 4,134 | Great Britain | Aug. 22, 1891 |
| 10,356 | Great Britain | May 7, 1903 |

OTHER REFERENCES

Mellor, "Comprehensive Treatise on Inorganic and Theoretical Chemistry," vol I, p. 280, vol. XI, pp. 513, 540.

Lange, "Handbook of Chemistry," 5th edition, pp. 762–763.